United States Patent

[11] 3,618,079

[72] Inventors: Everett L. Denning, Jackson, Mich.; Dan Goor, Lexington; Frederick J. T. Dow, Billerica; Michael P. Greenberg, Winchester, Mass.; Poul H. Anderson, Jackson, Mich.
[21] Appl. No. 738,710
[22] Filed June 20, 1968
[45] Patented Nov. 2, 1971
[73] Assignee Sparton Corporation, Jackson, Mich.

[54] SOLID STATE INTERRUPTER SYSTEM
3 Claims, 2 Drawing Figs.
[52] U.S. Cl. .................................... 340/384 E, 340/75, 340/329, 340/331
[51] Int. Cl. .................................... G08b 3/00
[50] Field of Search .......................... 340/388, 384 E, 331, 329, 75; 307/305; 317/148

[56] References Cited
UNITED STATES PATENTS
3,271,760 9/1966 Sloan, Jr. ............... 340/388
3,138,722 6/1964 Morgan ................. 317/148 X OTHER REFERENCES
Solid State Products, Inc., Bulletin D420- 02- 12- 59, 12/59 p. 7.

Primary Examiner—John W. Caldwell
Assistant Examiner—Michael Slobaksy
Attorney—Beaman & Beaman ABSTRACT: A solid state timing circuit of an interrupter system type utilizing a complementary pair of binary or square wave circuit, receiving pulses from a unijunction transistor oscillator to produce a pulsing square wave output. The pulse and square wave output may be used with a transistor switch circuit to operate a vehicle warning light system, for instance, and/or may be used in conjunction with a silicon controlled rectifier circuit for intermittently operating a vehicle horn. The silicon-controlled rectifier circuit utilizing the vibrating make and break contacts of a diaphragm-operated horn to switch the rectifier. Also, a short circuit protection circuit for the transistor switch circuit is disclosed.

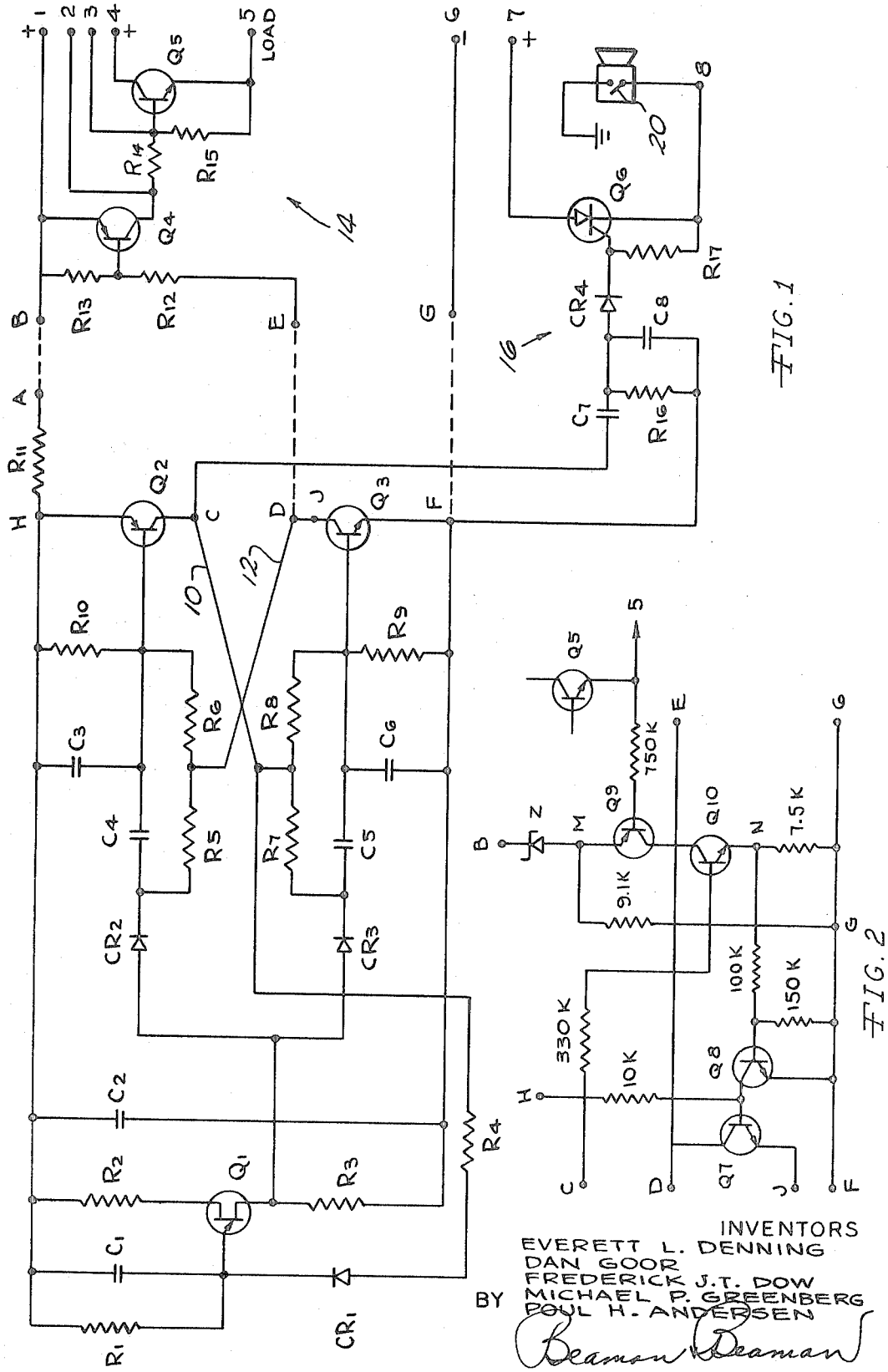

SOLID STATE INTERRUPTER SYSTEM

BACKGROUND OF THE INVENTION

The invention lies in the field of solid state electronic circuits controlling a square wave circuit by means of pulses wherein a pulsed square wave output is produced. In particular, the invention finds application in systems requiring a pulsing power supply, such as a vehicle warning light system, illuminated sign system, or the like.

Vehicles commonly utilize vehicle warning-light systems for turn indicating purposes, and to indicate emergency stops along the highway. Additionally, many commercial vehicles such as trucks, and earthmoving equipment, require backup warning systems which sound an alarm when the vehicle is moving in a reverse direction.

The aforementioned control circuits normally utilize bimetal control devices to make and break the circuit to the lights or horn to produce the desired pulsing and intermittent operation. Such bimetal devices though economical in cost, do not produce the high degree of reliability that is desirable wit this type of device in view of its safety requirements. Many states require that a commercial vehicle must have an operable warning light system before it can move upon the highway. Additionally, heretofore known warning devices of this type are susceptible to environmental temperature conditions and load variations. For instance, in a turn signal circuit both front and rear bulbs are simultaneously energized. Should one of the bulbs burn out, some bimetal type circuits become inoperative due to the change in characteristics of the circuitry.

SUMMARY OF THE INVENTION

It is a purpose of the invention to provide a highly reliable solid state electronic timer circuit which is of a relatively low cost, is capable of producing consistent operational characteristics throughout a wide temperature range, and will remain operable even though the load characteristics vary due to burned out light bulbs, or the like.

An additional object of the invention is to provide a solid state timing circuit system utilizing transistors to produce a square wave output, and utilizing a unijunction transistor oscillator to pulse the square wave output whereby a transistor switch circuit may be used to control the utilization means.

A further object of the invention is to provide a silicon-controlled rectifier circuit used in combination with a pulsed square wave circuit, and controlling utilization means incorporating a make and break contact wherein the operation of the contacts functions as the means for interrupting the rectifier load current to produce the desired operational characteristics thereof. In particular, the utilization means employed with the silicon-controlled rectifier in an electromagnetic diaphragm-type horn utilizing vibrating contacts to control operation of the electromagnet. In this manner the rectifier circuit is simplified and the horn itself becomes a part of the circuit.

An additional object of the invention is to provide a solid state timer circuit of a versatile nature which may be readily wired for either positive or negative ground systems and which permits a degree of versatility enabling the system to be readily used with existing vehicles, horns, and/or warning-light systems.

Another object of the invention is to provide a solid state timer circuit which may be used with vehicle light systems which minimizes the time between actuation of the vehicle light system and the time in which the lights begin operating.

The invention also includes optional short circuit protection for the transistor switch used with a warning light system wherein the transistor circuit is automatically protected in the event of a short and the circuitry is automatically returned to operation upon removal of the short circuit condition.

In the practice of the invention a fully transistorized complementary pair binary or square wave circuit is used in conjunction with a unijunction transistor oscillator and receives positive pulses therefrom. The positive pulses received from the oscillator alternately switch the transistors on and off in such a manner as to produce a pulsed square wave output. The operation of the oscillator is such that the resistors and capacitors through which the charging current travels vary the duration of time between pulses supplied by the oscillator to the square wave circuit. Thus, the square wave circuit can produce a variable on and off cycle. For instance, in an embodiment of the invention the square wave output is off 70 percent of the time and on 30 percent. This operation of the oscillator is accomplished through a feedback circuit interconnecting the collector of one of the square wave producing transistors and the unijunction transistor emitter of the oscillator.

BRIEF DESCRIPTION OF THE DRAWING

The aforementioned objects of the invention will be more completely appreciated from the following description of an embodiment of the invention illustrated in the circuits shown in the drawing wherein:

FIG. 1 is a diagram of the timer, transistor switch and horn-operating circuits, the transistor switch being shown as optionally connected to the timer circuit by dotted lines, and FIG. 2 is a diagram of a short circuit protection circuit which may be optionally used with the transistor switch.

DESCRIPTION OF THE PREFERRED EMBODIMENT

The drawing illustrates an embodiment of the invention which is particularly suitable for use for vehicle warning systems to operate a vehicle warning light circuit, a backup warning circuit, or both.

In the disclosed circuit a negative supply transistor is represented at Q2 of the PNP-type such as a 2N4125. This transistor is used in conjunction with transistor Q3 of the NPN-type 2N4123, a positive supply transistor.

The unijunction transistor oscillator Q1 of the N-channel type 2N4870 is used to transmit positive pulses to the complementary pair transistor binary or square wave circuit formed by Q2 and Q3.

The circuitry associated with Q1 includes resistance R1 having a value of 560 K, a resistance R2 having a value of 1.2 K, and a resistance R3 having a value of 100 ohms. Additionally, the circuit includes capacitor C1 having a value of 1 μf. and diode CR1 of the 1N914 type and a resistance R4 is connected in series with CR1 and has a value of 390 K. A capacitor C2 having a value of 0.47 μf. is connected across the conductors associated with R2 and R3.

C2 is used in conjunction with resistance R11 which has a value of 47 ohms to prevent spurious triggering of the complementary pair binary circuit from electrical noise which may be present in the power source.

The base circuit of Q2 includes resistances R5 and R6 having values of 5.6 K and 1 K, respectively. Diode CR2 is of the 1N914 type and connects to a capacitor C4 of a value of 0.022 μf. Capacitor C3 has a value of 0.0015 μf. and resistance R10 has a value of 1 K.

The base circuit of Q3 includes resistors R7 and R8 having values of 5.6 K and 1.0 K, respectively. Diode CR3 is the 1N914 type and capacitor C5 has a value of 0.022 μf. Capacitor C6 has a value of 0.0015 μf, and resistance R9 has a value of 1 K.

The collector of Q2 is connected between R7 and R8 by conductor 10, and the collector of Q3 is connected between R5 and R6 by conductor 12.

Terminal A is associated with the timer circuit through R11 and terminal F is connected to the emitter of Q3. Additional terminals include C, connected to the collector Q2, and terminal D associated with the collector of Q3.

The operation of the timer circuit will be appreciated from the following:

A positive DC power supply, such as 12 volts, is connected to terminal A, while the negative terminal is connected to circuit at F. Under an initial condition, Q2 and Q3 can both be nonconducting. When the first positive pulse from Q1 occurs it is coupled through CR3 and C5 to the base of Q3 starting Q3 to conduct. Collector current in Q3 also constitutes the base current for Q2 conducting. The collector current for Q2 is the base current for Q3 through R8 which makes Q3 conduct to an even greater extent. The result is a regenerative action which brings both Q2 and Q3 into immediate saturation. The first positive pulse from Q1 is also coupled to the base of Q2 through CR2 and C4 which tends to reverse-bias the emitter base junction of Q2. This effect is overridden by the amplification and inversion of the pulse by Q3. When both Q2 and Q3 are in saturation, C4 assumes a near negative supply potential on the left side, and a nearly positive supply potential on the right side by virtue of the charging path through R5. Similarly, C5 assumes a nearly positive supply potential on the left side and an almost negative supply potential on the right side as a result of the charge path through R7.

Upon the occurrence of a second positive pulse from Q1, CR3 will remain back-biased during the duration of the second pulse since the left side of C5 is at an almost positive supply potential. Thus, no effect will be made through C5 to the base of Q3. However, CR2 will be forward-biased since the left side of C4 is near ground potential. The result is a positive pulse at the base of Q2 rising far above positive supply potential which tends to turn Q2 off. Regenerative action takes place again, but in a different sense than that previously described, and Q2 and Q3 almost instantaneously cease conduction. The charges on C4 and C5 bleed off through R5, R6, R7, and R8, respectively, and the circuit is ready to repeat the off-on cycle.

A special feedback circuit between the collector of Q2 and the emitter of Q1 modifies the duty cycle, or the on-off cycle of the square wave output. When Q2 is conducting, R4 and CR1 create a secondary charge path for C1, which essentially parallels R1, causing C1 to charge more rapidly. The result is a shorter time between the Q1 pulses representing the timing circuit "on" period. The repetition rate and duty cycle can be carried over a wide range by making changes in the values of R1, C1 and R4.

When using the timer circuit to control a warning light system a transistor switch circuit, generally represented at 14 may be employed. This transistor switch circuit includes transistor Q4 of the PNP-negative supply type PLE37 having a collector connected to the base of an NPN-transistor Q5 of the PLE28 type.

The transistor switch circuit includes terminal E which is connected to terminal D for the transistor type shown, and terminal B is connected to terminal A for the transistor type described. The circuit from terminal E to the base of Q4 includes resistance R12 having a value of 330 ohms, and the circuit from terminal B to the base of Q4 includes resistance R13 having a value of 470 ohms. The collector of Q4 is connected to the base of Q5. Resistance R15 is of a value of 100 ohms.

Terminal B is connected to a terminal 1, the collector of Q4 is connected to terminal 2, the base of Q5 communicates with terminal 3, the collector of Q5 is connected to terminal 4, and the emitter of Q5 is connected to terminal 5. Terminal F is connected to terminal G which, in turn, is connected to terminal 6 of the transistor switch.

In a vehicle warning-light environment used on a vehicle having negative ground, terminal 1 is connected to the positive supply source of the vehicle, usually through the turn and warning signal switch, and terminal 6 is connected to the ground potential. Terminals 2 and 3 are interconnected and terminal 4 is connected to terminal 1. Terminal 5 constitutes the load terminal which would be connected to the bulbs of the warning-light system.

When the power source is applied, the aforedescribed circuitry will provide a pulsing supply of power which is approximately energized 30 percent of the time, and having a 70 percent "off" cycle. This duration of cycling is that considered to be most desirable for vehicle turn and warning signals.

If desired, it would also be possible to connect a horn, buzzer or other audible backup warning device to terminal 5 for energization by the described circuit.

If it is desired to use the pulsed square wave circuit in conjunction with only a horn or other audible warning system using vibrating contacts, the aforedescribed transistor switching circuit can be eliminated, and a silicon-controlled rectifier circuit employed to operate the horn.

FIG. 1 discloses a circuit of 16 utilizing a silicon-controlled rectifier Q6 of the 2N4441 type. Terminal C is also connected to the rectifier circuit through capacitor C7 of a value 1 μf. Terminal F is connected to the rectifier circuit through a resistance R16 of 47 K and a capacitor C8 of a value 510 pf. Diode CR4 is of the 1N914 type, and resistance R17 has a value of 470 ohms. The supply side of silicon controlled rectifier Q6, in a negative ground system is connected to terminal 7, and the horn load is connected to terminal 8.

The horn 18 is of the conventional automotive type including an electromagnet connected to a diaphragm. The electromagnet circuit includes contacts 20 adapted to rapidly vibrate forming a make and break circuit to impart the desired vibration to the diaphragm for producing audible signals.

The horn provides load characteristics which allow the silicon-controlled rectifier Q6 to be turned off without interrupting the main current supply. Q6 is turned on by a positive pulse obtained from Q2 of the timing circuit. The capacitor C7 and resistance R16 form a differentiator circuit with a time constant selected to allow C7 to become nearly fully charged during the "on" period of the timing circuit. When the timing circuit turns "off" a negative pulse appears at the anode of CR4 to assure complete turnoff of the Q6 gate current.

Actual turnoff of Q6 is achieved by virtue of the interruption of load current by the horn contacts. It will be appreciated that this type of silicon-controlled rectifier circuit can be used with any load which intermittently draws current in a manner similar to a vibrating contact horn.

If the described circuitry is to be used with a positive ground system, terminal 1 is grounded and terminal 6 is connected to a negative potential, as is terminal 5. Terminals 2 and 3 are not connected, and terminal 4 becomes the load terminal. In a positive ground system terminal 7 is connected to the horn, while terminal 8 is connected to ground.

In the disclosed transistor switch circuit a PNP-NPN-connection is illustrated.

If an NPN-PNP-combination is desired, terminal A is connected to terminal G, terminal F is connected to terminal B and terminal C is connected to terminal E. In this instance, in a negative ground environment, terminal 1 is grounded and terminals 5 and 6 are connected to the positive supply potential. Terminals 2 and 3 are not connected, and terminal 4 becomes the load terminal.

In an NPN-PNP-transistor switch arrangement using a positive ground, terminal 1 is connected to the negative potential while terminal 6 is grounded. Terminals 2 and 3 are interconnected, and terminal 4 is connected to the negative supply potential. Terminal 5 becomes the load terminal.

In all embodiments of wiring, Q4 is driven into saturation during the "on" period of the flasher and the collector current of Q4, in turn, drives Q5 into saturation to carry the load current.

FIG. 2 illustrates a transistorized short circuit protection circuit which may be used in conjunction with the timer circuit of the invention for use with the transistor switch. The purpose of this circuit is to protect the transistor switch circuit from possible damage resulting from a short circuit occuring in the load circuitry.

In FIG. 2 the values of the various components are indicated directly upon the drawing. In this circuit the terminal C is connected to the base of an NPN-transistor Q10 wherein the collector of Q2 is connected to the base of Q10. The emitter of Q2 is connected to the base of an NPN-transistor Q7 in that the base of Q7 is connected to terminal H through a 10 K resistor. The collector of Q3 continues to be directly connected to the terminal E of the transistor switch. However, the previously direct connection occurring between terminals D and J is removed, and terminals D and J are now interconnected through Q7, as illustrated in FIG. 2. The collector of an NPN-transistor Q8 connects the base of Q7, and the emitter of this transistor is connected to terminal F. The terminal F continues to connect to terminal G, and ultimately terminal 6.

The collector of Q10 is connected to the collector of a PNP-transistor Q9, and the base of Q9 is connected to terminal 5, as well as being connected to the emitter of Q5, of the transistor switch circuit, as shown in FIG. 2.

The emitter of Q9 is connected to the zener diode Z, which is connected to the supply at terminal B. The ground terminal G is connected to the diode circuit through a 9.1 K resistance.

Assuming the apparatus to be used with a 12-volt direct current supply, the zener diode Z is used to establish a voltage reference of negative 7.5 at M with respect to the positive supply voltage. The 9.1 K resistor provides the bleeder current for the zener diode Z to keep the diode operating in the zener region at all times. Transistors Q9 and Q10 are in series and, therefore, both transistors must be forward-biased to allow current to flow through either transistor. The 7.5 K resistor in the emitter of Q10 completes a series circuit from the supply through the zener diode Z, Q9, and Q10. The circuit represented by Q9, Q10 and the 7.5 K resistor forms one variation of a circuit commonly known in the digital logic art as an AND gate. Point N is the output terminal of the AND gate.

For a voltage potential other than essentially the negative supply voltage to appear at point N it is necessary for current to flow through Q9 and Q10 and this condition exists, as previously mentioned, only when Q9 and Q10 are both forward-biased.

Biasing of Q9 is accomplished through the 750 K resistor in the base circuit of Q9. The end of the 750 K resistor opposite the Q9 base is connected to the load terminal in the transistor switch. In order for Q9 to be forward-biased, the load voltage must be negative with respect to the voltage established by the zener diode at point M, supply voltage minus zener voltage.

Q10 is biased by the collector potential of Q2 terminal C through the 330 K resistor to the base of Q10. For Q10 to be forward-biased it is necessary for Q2 to be "on" or, in other words, at essentially the positive supply voltage.

Q9 is "off" when the load is "on" and Q10 is "on" because the collector potential of Q2 will be essentially at supply potential at the time the load is "on." When the load is "off" the situation is reversed and there is no output from the AND gate at point N in either case. This all assumes that no short circuit condition exists.

When a short circuit occurs and the load voltage fails to rise above the threshold established by the zener diode Z, Q9 will remain "on" with the load "on" and, of course, the sequence of the timer drive, Q2 and Q3, is such that Q10 will also be "on." The result is that an output of approximately 5 volts will occur at point N.

Normally Q7 is "on" by virtue of the 10 K resistor in the base of Q7, and normal operation of the timer circuit is not disturbed because Q3 collector currents flow through Q7. When a short circuit occurs and an output is obtained from the AND gate, Q8, which is biased normally "off," is turned "on" and diverts or essentially short circuits the base current of Q7 to ground. Therefore, Q7 turns "off" and creates an open circuit in the collector circuit of Q3. The forward bias on Q2 is lost and Q2 ceases to conduct. Therefore, the forward bias on Q3 is also lost and Q3 ceases to conduct. The result is that the drive to Q4 and Q5 ceases almost instantly, and protects the output transistor Q5 from destruction.

If the short circuit remains until another pulse from the unijunction transistor oscillator Q1 in the timing circuit occurs, the circuit will attempt to turn "on" again but the AND gate will again provide an output and repeat the short circuit protection action. If, however, the short is removed, the circuit will return to normal operation.

The short circuit protection circuit operates on the concept whereby the voltage drop across a transistor switch or other semiconductor switching device is sensed by a comparison circuit to close or open a switch. This switch is incorporated in a series circuit with a second switch to form what is commonly called an AND gate. The second switch is controlled by the same drive circuitry as the load current switching device. The output of the AND is used to activate circuitry to remove the drive to the load switching device or could be used to open another switching device in series with the power source, or load.

In the example set forth, normal, nonshort-circuit operation is such that Q9 is "off" when the load is "on" and Q10 is "on" and the AND gate output voltage is essentially zero. In another embodiment, the transistor types for Q9 and Q10 could be interchanged, Q9 would be an NPN and Q10 would be a PNP. Q9 would then be "on" and Q10 would be "off" when the load is "on" and no short circuit exists.

It will be apparent to those skilled in the art that NAND gate logic could also be employed. In this case the safety device would be designed to be activated when there is a zero or no output from the NAND gate.

Thus, the aforedescribed arrangement prevents the transistor switch circuitry from being damaged due to a short circuit condition, yet provides that the circuitry can be reestablished to normal operation as soon as the short circuit condition is corrected.

It is appreciated that modifications to the inventive concept may be apparent to those skilled in the art without departing from the spirit and scope of the invention, and it is intended that the invention be defined only by the scope of the following claims:

1. A solid state timing circuit for use with a vehicle warning system, comprising, in combination, a negative supply transistor, conductor means interconnecting said transistors to define a complementary pair transistor binary output circuit, a power supply connected to the emitters of said transistors, a unijunction transistor oscillator circuit, first means connecting said unijunction transistor circuit to the base of said positive supply transistor, second means connecting said unijunction transistor circuit to the base of said negative supply transistor whereby a positive pulse from said unijunction transistor starts said positive supply transistor conducting and produces a regenerative action causing saturation of said supply transistors the following positive pulse from said unijunction transistor producing a positive charge on the base of said negative supply transistor higher than the positive power supply potential tending to turn said negative supply transistor off producing a negative action in the opposite sense than that previously occurring ceasing conduction of said supply transistors and preparing the circuit for the next cycle to produce a pulsing square wave output, a capacitor within said oscillator circuit, a feedback circuit interposed between the collector of said negative supply transistor and the emitter of said unijunction transistor oscillator circuit including said capacitor whereby conducting of said negative supply transistor aids in charging said capacitor producing unequal durations of time between pulses produced by said unijunction transistor oscillator circuit, and a transistor switching circuit having an output, said switching circuit being connected to said square wave output receiving a pulsed square wave output signal therefrom, and a vehicle light-waving system connected to and receiving the output of said switching circuit.

2. A solid state timing circuit for use with a vehicle warning system, comprising, in combination, a negative supply transistor, conductor means interconnecting said transistors to define a complementary pair transistor binary output circuit, a power supply connected to the emitters of said transistors, a unijunction transistor oscillator circuit, first means connecting said unijunction transistor circuit to the base of said positive supply transistor, second means connecting said unijunction transistor circuit to the base of said negative supply transistor whereby a positive pulse from said unijunction transistor starts said positive supply transistor conducting and produces a regenerative action causing saturation of said supply transistors, the following positive pulse from said unijunction transistor producing a positive charge on the base of said negative supply transistor higher than the positive power supply potential tending to turn said negative supply transistor off producing a regenerative action in the opposite sense than that previously occuring ceasing conduction of said supply transistors and preparing the circuit for the next cycle to produce a pulsing square wave output, a capacitor within said oscillator circuit, a feedback circuit interposed between the collector of said negative supply transistor and the emitter of said unijunction transistor oscillator circuit including said capacitor whereby conducting of said negative supply transistor aids in charging said capacitor producing unequal durations of time between pulses produced by said unijunction transistor oscillator circuit, and a silicon-controlled rectifier circuit connected to said square wave output, said rectifier circuit having an output connected to a vehicle warning circuit including vibrating opening and closing contacts rapidly making and breaking said warning circuit upon being energized, said contacts controlling switching of said rectifier.

3. In a solid state timing circuit as in claim 2 wherein said warning circuit comprises a diaphragm-type horn.

* * * * *

UNITED STATES PATENT OFFICE
CERTIFICATE OF CORRECTION

Patent No. 3,618,079  Dated November 2, 1971

Inventor(s) Everett L. Denning, et al.

It is certified that error appears in the above-identified patent and that said Letters Patent are hereby corrected as shown below:

Column 6, line 35, before "conductor" insert -- a positive supply transistor, -- ;

Column 6, line 45, after "transistors" insert -- , -- ;

line 49, cancel "negative" and substitute -- regenerative -- ;

Column 6, line 66, before "conductor" insert -- a positive supply transistor, -- .

Signed and sealed this 2nd day of May 1972.

(SEAL)
Attest:

EDWARD M. FLETCHER, JR.
Attesting Officer

ROBERT GOTTSCHALK
Commissioner of Patents